Dec. 20, 1949  C. J. ROOS  2,491,621
WINDOW WASHER'S SCAFFOLD
Filed Sept. 17, 1946  2 Sheets-Sheet 1

Inventor
C. J. Roos
By Knowles
Attorneys.

Dec. 20, 1949  C. J. ROOS  2,491,621
WINDOW WASHER'S SCAFFOLD
Filed Sept. 17, 1946  2 Sheets-Sheet 2
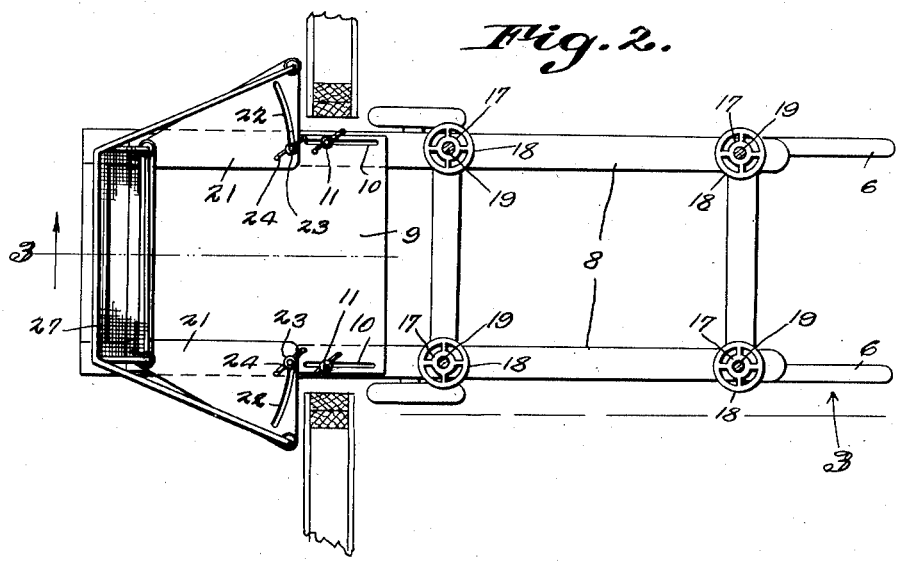
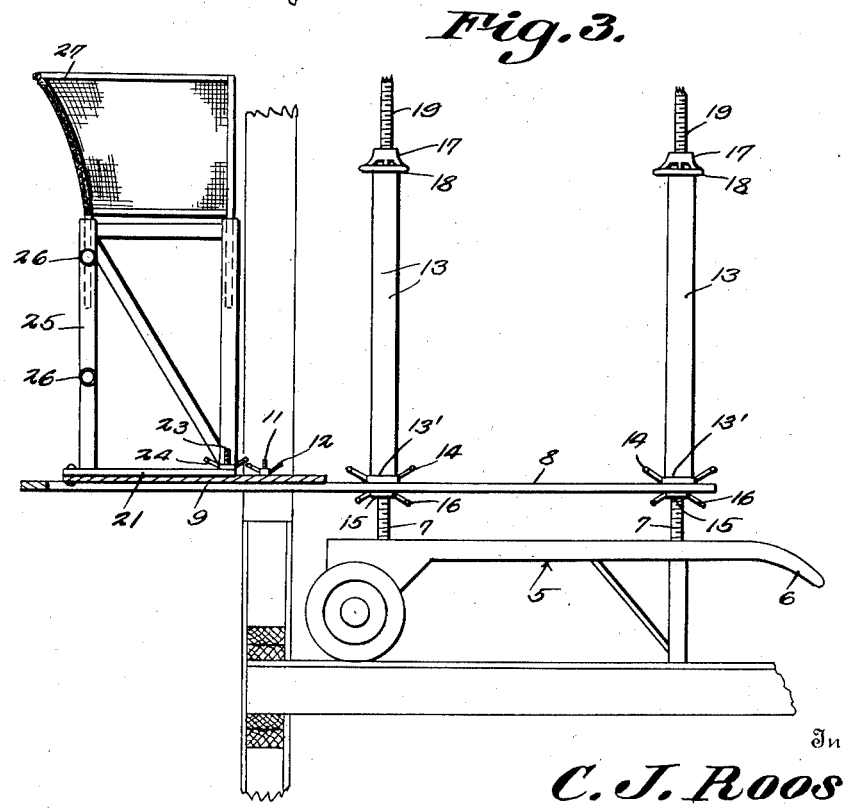
Inventor
C. J. Roos Patented Dec. 20, 1949

2,491,621

UNITED STATES PATENT OFFICE 2,491,621

WINDOW WASHER'S SCAFFOLD

Charles Johannes Roos, Muskegon, Mich.

Application September 17, 1946, Serial No. 697,547

3 Claims. (Cl. 304—24)

This invention relates to scaffolds, and more particularly to portable scaffolds of the type which may be readily rolled into position and extended through a window for use by window washers in washing the windows.

An important object of the invention is to provide a scaffold which may be extended through the window, the platform of the scaffold being supported exteriorly of the window so that the window washer may stand thereon and wash the window with facility, without danger of the window washer falling.

A further object of the invention is to provide a scaffold which will prevent injury to persons due to falling bricks or other objects while making repairs or during construction work.

Still another object of the invention is to provide a portable scaffold having means to secure the scaffold against moving or becoming displaced while in use.

Another object of the invention is to provide a wheel-supported frame and a platform supported for vertical adjustment with respect to the frame, thereby adapting the scaffold for use in washing windows which are various heights from the floor.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 2 is a plan view thereof.

Figure 3 is a sectional view taken on line 3—3 of Figure 2.

Figure 1:
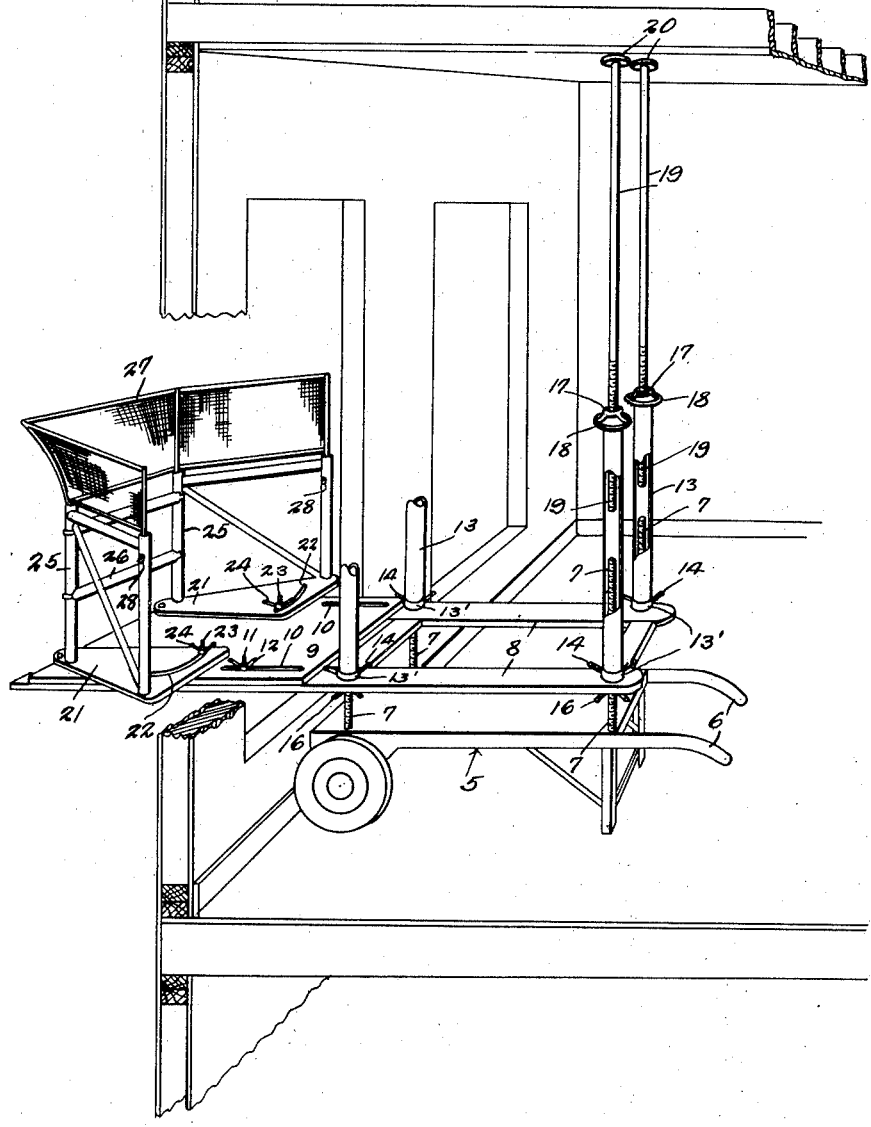
Figure 1 is a perspective view illustrating a portable scaffold constructed in accordance with the invention, as positioned within a window, providing a platform for a window washer.

Referring to the drawings in detail, the scaffold embodies a wheel supported frame or truck 5, which is provided with handles 6 so that the frame or truck 5 may be readily moved from place to place.

Disposed at the four corners of the frame or truck 5 and rising therefrom, are threaded rods 7 that extend through the arms 8, the arms 8 providing a support for the platform 9 which is provided with elongated openings 10 through which the securing bolts 11 extend, the bolts 11 having wing nuts 12 thereon by means of which the platform 9 may be secured in position on the arms 8.

Tubes 13 are fitted over the threaded rods 7, and are provided with threaded openings in their lower ends to accommodate the threaded rods 7, there being provided arms 14 secured to the tubes 13, whereby the tubes may be rotated to adjust them longitudinally of the threaded rods 7. Threaded collars 14 are also mounted on the rods 7, directly under the arms 8, and are adapted to provide a support for the arms 8 to prevent the arms from moving downwardly. Arms 16 are formed on the threaded collars 15 and afford means whereby the collars may be rotated and adjusted longitudinally of the threaded rods.

At the upper ends of the tubes 13, are spiders 17 which have rings 18 fitted over the upper ends of the tubes. The spiders are threaded to receive the threaded ends of the brace rods 19 that are of lengths to extend to the ceiling above the scaffold, the upper ends of the rods 19 being formed with discs 20 that rest against the ceiling of the room in which the scaffold is positioned to prevent damage to the ceiling.

Mounted on the platform 9 are pivoted plates 21 that are substantially triangular in formation, and these plates are provided with arcuate shaped openings 22 that accommodate the bolts 23 rising from the platform 9, the bolts 23 being provided with nuts 24 which may be rotated through frictionally engaged plates 21 and hold them in their adjusted positions. It will be seen that because of the construction of the plates, the plates 21 may be swung to various angular positions with respect to the platform 9, to widen the guard which is supported by the plates, to enclose a window of a particular width.

The plates 21 provide a support for the guard which includes uprights 25, cross bars 26 and an outwardly inclined guard frame 27 that extends from the upper ends of the uprights 25.

As clearly shown by Figure 3 of the drawings, the guard frame is provided with extensions that fit into the upper ends of the uprights 25, and are secured in position by means of the thread screws 28.

Due to this construction it will be seen that the scaffold may be readily dismantled to facilitate storage.

In the use of the device, the scaffold is adjusted for use, and the platform end thereof is extended through the window to be washed, as shown by Figure 1 of the drawings.

The rods 19 are now positioned to engage the ceiling of the room to hold the scaffold in a horizontal position against tilting under the weight of the person standing on the extended end of the platform.

The window washer can now have easy access to the window and will be guarded against falling from the window during the washing operation.

Having thus described the invention, what is claimed is:

1. A portable window washer's scaffold, comprising a truck, threaded rods arising from the four corners of the truck, arms mounted on the threaded rods, means on the rods and engaging the arms for moving the arms vertically with respect to the truck, a platform adjustably secured to the arms and adapted to be extended through a window opening, supporting a person washing a window, and means for securing the truck against movement.

2. A portable window washer's scaffold, comprising a truck, a platform mounted for vertical adjustment with respect to the truck, said platform being extended beyond one end of the truck, a guard rail for the platform, adjustable rods extending from the truck and adapted to extend to the ceiling of the room in which the truck is positioned, exerting pressure against the ceiling and holding the truck against movement.

3. A portable window washer's scaffold, comprising a truck, a platform including a pair of arms mounted for vertical adjustment with respect to the truck, a platform plate secured to the arms, a pair of adjustable triangular plates mounted on the platform, means for securing the plates against movement with respect to the platform, a guard rail mounted on the plates and movable therewith, the guard rail surrounding the platform, and adjustable means on the truck for engaging the ceiling of the room in which the truck is positioned for securing the truck against movement.

CHARLES JOHANNES ROOS.

REFERENCES CITED

The following references are of record in the file of this patent:

UNITED STATES PATENTS

| Number | Name | Date |
|---|---|---|
| 1,362,944 | Kirby | Dec. 12, 1920 |
| 1,761,726 | Havens | June 3, 1930 |
| 2,035,294 | Black | Mar. 24, 1936 |
| 2,106,002 | Hall | Jan. 18, 1938 |
| 2,248,794 | Troche | July 8, 1941 |